US010415682B2

(12) United States Patent
Hirota et al.

(10) Patent No.: US 10,415,682 B2
(45) Date of Patent: Sep. 17, 2019

(54) DIFFERENTIAL CASE

(71) Applicant: GKN Driveline Japan Ltd, Tochigi, Tochigi (JP)

(72) Inventors: Isao Hirota, Tochigi (JP); Noboru Higano, Tochigi (JP); Masahiko Asahi, Tochigi (JP)

(73) Assignee: GKN Driveline Japan Ltd, Tochigi (JP)

( * ) Notice: Subject to any disclaimer, the term of this patent is extended or adjusted under 35 U.S.C. 154(b) by 78 days.

(21) Appl. No.: 15/801,632

(22) Filed: Nov. 2, 2017

(65) Prior Publication Data

US 2018/0180152 A1 Jun. 28, 2018

Related U.S. Application Data

(63) Continuation of application No. PCT/JP2015/071470, filed on Jul. 29, 2015.

(51) Int. Cl.
*F16H 48/38* (2012.01)
*F16H 48/40* (2012.01)
(Continued)

(52) U.S. Cl.
CPC ............ *F16H 48/40* (2013.01); *F16H 48/08* (2013.01); *F16H 57/0428* (2013.01); *F16H 2048/382* (2013.01); *F16H 2048/385* (2013.01)

(58) Field of Classification Search
CPC ..................................................... F16H 48/38
See application file for complete search history.

(56) References Cited

U.S. PATENT DOCUMENTS 6,945,898 B2 *  9/2005  Szuba ..................... F16H 48/08
                                                           475/230
8,562,477 B2 * 10/2013  Mizoguchi ............. F16H 48/08
                                                           475/220

(Continued)

FOREIGN PATENT DOCUMENTS

CN       101375088 A      2/2009
CN       201866211 U      6/2011
(Continued)

OTHER PUBLICATIONS

International Search Report and Written Opinion dated Oct. 27, 2015 (8 pages; with English translation).

(Continued)

*Primary Examiner* — Tisha D Lewis
(74) *Attorney, Agent, or Firm* — Bejin Bieneman PLC (57) ABSTRACT

A case for a differential gear set includes: a rotatable carrier having a cylindrical fitting face and a radially projecting flange having an axially directed butting face; a cover having a brim section so projecting axially as to fit on an outer periphery of the flange and so dimensioned as to align an end face of the brim section with the butting face; a ring gear fitting on the fitting face and having a back face in contact with the butting face; and a weld metal uniting the carrier, the cover and the ring gear together, wherein the butting face of the carrier, the end face of the cover and the back face of the ring gear are so dimensioned as to keep a circular groove exposed outward and reaching an interface between the back face and the butting face and the weld metal fills the groove.

5 Claims, 6 Drawing Sheets

(51) Int. Cl.
*F16H 48/08* (2006.01)
*F16H 57/04* (2010.01)

(56) References Cited

U.S. PATENT DOCUMENTS

| | | | |
|---|---|---|---|
| 9,120,184 B2 * | 9/2015 | Uchida | B23K 31/125 |
| 2007/0287570 A1 | 12/2007 | Bock | |
| 2012/0028750 A1 | 2/2012 | Micoguchi | |
| 2018/0038466 A1 * | 2/2018 | Shirakawa | F16H 48/40 |
| 2018/0306300 A1 * | 10/2018 | Rothstein | F16H 55/17 |

FOREIGN PATENT DOCUMENTS

| | | |
|---|---|---|
| CN | 102388238 A | 3/2012 |
| JP | 55-139176 A | 10/1980 |
| JP | S55-139176 A | 10/1980 |
| JP | 2010091046 A | 4/2010 |
| JP | 2010-242930 A | 10/2010 |
| JP | 2011161506 A | 8/2011 |

OTHER PUBLICATIONS

First Office Action for Application No. CN201580079201.8 dated Apr. 2, 2019 (6 pages).

* cited by examiner

DIFFERENTIAL CASE

CROSS-REFERENCE TO RELATED APPLICATIONS

This application is a continuation application of PCT International Application No. PCT/JP2015/071470 which was filed Jul. 29, 2015, the entire contents of which are incorporated herein by reference.

BACKGROUND

As is well known, a vehicle is comprised of one or more differential gears and each of them includes a differential gear set for allowing output shafts to make differential motion, which transmits torque input to a differential case to the pair of output shafts for example.

Sometimes a mechanism for limiting differential motion is contained in the differential case along with the differential gears. For convenience of carrying the mechanism or such therein, a case of a two-piece type, which is dividable into two or more portions, may be used. In the two-piece case, after carrying components into the case, a cover is attached thereto, and, after fastening them together or for the purpose of fixation, a ring gear is fastened to the case. As bolts for the fastening must bear torque transmitted from the ring gear to the case, these bolts must be of a large type and have sufficient strength.

Arts in which welding is used in place of use of the bolts have been proposed. The following documents disclose related arts.
Japanese Patent Application Laid-open No. 2010-91046
US Patent Application Publication 2007/0287570 A1

SUMMARY

Although the aforementioned arts enable fixation by welding, cases and covers are required to have complex structures adapted for the arts. These complex structures have adverse impact on pursuit of working accuracy and of course raise working cost severely.

The subject disclosed hereinafter provides a simple structure and yet enables firm fixation. The present disclosure relates to a case for a differential gear set and, in particular, relates to a case dividable into two pieces and yet capable of being unified by welding.

A case for a differential gear set according to an aspect is comprised of: a carrier rotatable about an axis and supporting the differential gear set, the carrier comprising a fitting face forming a cylindrical surface around the axis and a flange projecting radially from the fitting face and having a butting face directed in an axial direction; a cover in combination with the carrier defining a chamber for housing the differential gear set, the cover comprising a brim section projecting axially so as to fit on an outer periphery of the flange and so dimensioned as to align an end face of the brim section with the butting face; a ring gear comprising an inner peripheral face fitting on the fitting face, a back face at least partly in contact with the butting face, and gear teeth for receiving torque about the axis; and a weld metal joining the carrier, the cover and the ring gear together, wherein one or more of the butting face of the carrier, the end face of the cover, and the back face of the ring gear are dimensioned so as to keep a circular groove exposed outwardly and reaching an interface between the back face and the butting face, and the weld metal fills the groove.

DESCRIPTION

Exemplary embodiments will be described hereinafter with reference to FIGS. 1 through 7.

Throughout the following description and the appended claims, an axial direction is defined as a direction along a rotation axis of a differential device unless described otherwise. Further, while the top and the bottom, or the right and the left, are distinguished, this is merely for the convenience of explanation and therefore does not limit the described embodiments. Descriptions will be given hereinafter by referring an example of a limited-slip differential device (LSD) with a bevel gear set, whereas the present embodiments are also applicable to differential devices of any type.

Figure 1:
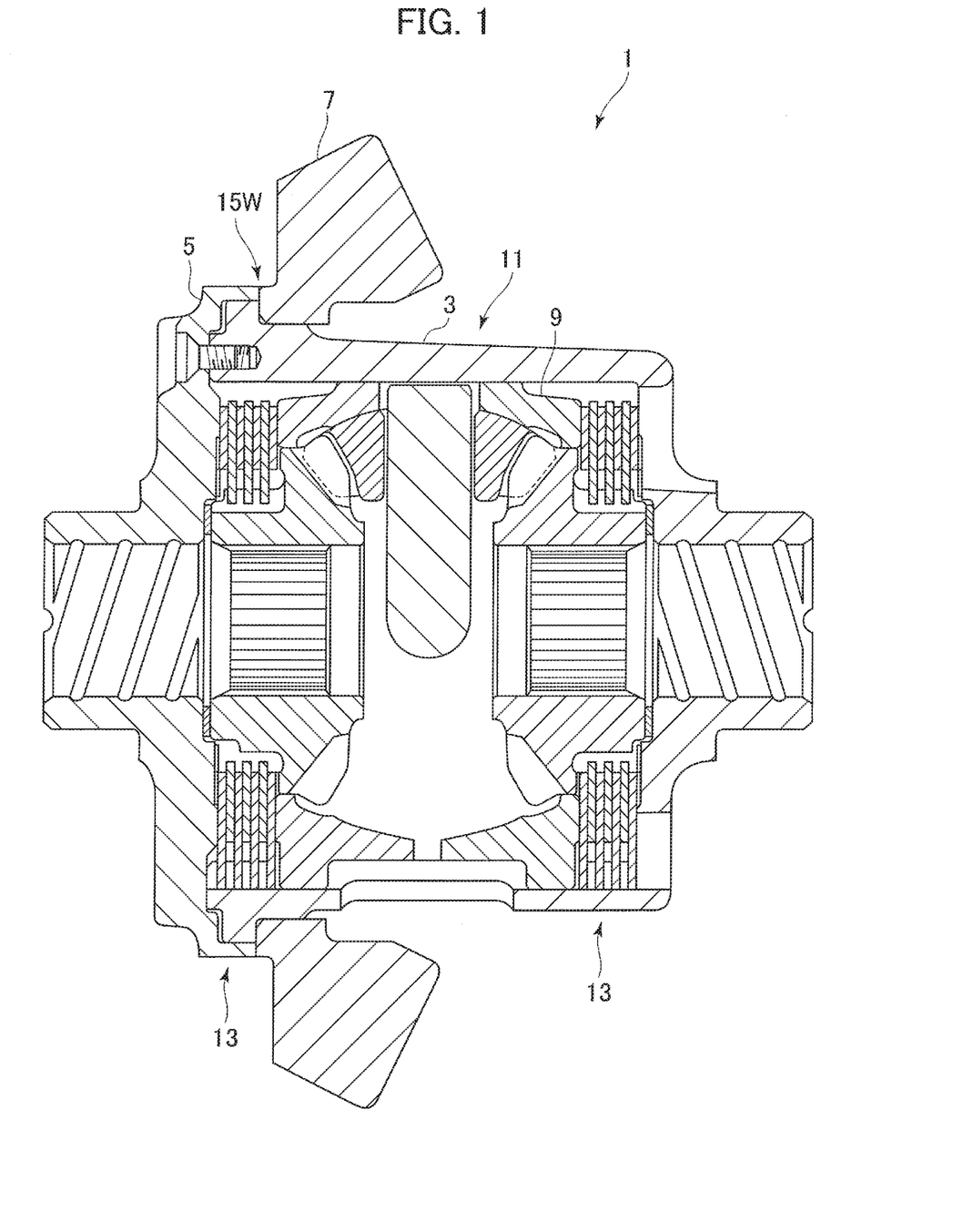
FIG. 1 is an elevational sectional view of a differential gear and a case according to an embodiment.

Referring to FIG. 1, a differential gear 1 is in general comprised of a carrier 3, a cover 5, a ring gear 7 and a differential gear set 11. The differential gear set 11 is supported by the carrier 3 and thereby rotates together. While torque input through the ring gear 7 puts the carrier 3 into rotational motion, as the differential gear set 11 allows differential motion between right and left side gears, the input torque is differentially distributed to right and left axles.

The carrier 3 is a vessel having a shape similar to a bowl, which is made of a cast iron for example. As the cast iron, JIS FCD450 or FCD600 or ASTM 65-45-12 or 80-55-06 may be used, but this disclosure is not limited to these.

In the carrier 3, further, a multi-plate clutch 13 for limiting differential motion and a cam member 9 for driving the same, and any other components, may be incorporated. These components may be selected in accordance with a type of the differential device and are thus not limiting elements.

Figure 2:
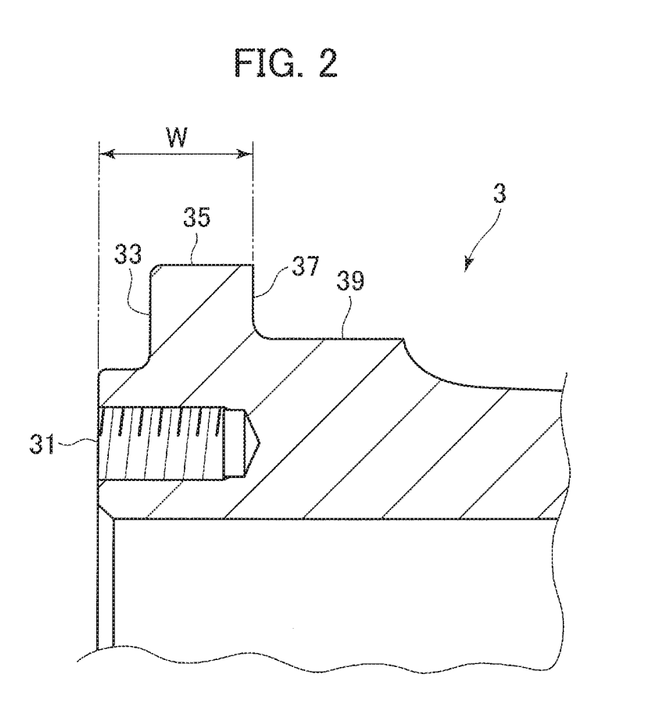
FIG. 2 is an elevational sectional view of a carrier, which illustrates an end section in an enlarged view.

The carrier 3, seen in FIG. 2 without the cover 5, opens at one end (the left end in the drawing), and the gear set 11 and the other components can be carried therein through the opening. The cover 5 is contacts an end face around the opening. The end face 31 may have a plurality of screw holes for fastening the cover 5.

A flange projects radially outward from a part adjacent to the end face 31, and a brim section of the cover 5 fits on an outer peripheral face 35 of the flange. Further adjacent to the flange, the carrier 3 is comprised of a fitting face 39 forming a cylindrical surface symmetrically about the axis. The ring gear 7 fits on this fitting face 39. The fitting face 39 is preferably slightly larger in diameter than the main body of the carrier 3. Furthermore, with a butting face 37 of the flange, which is directed toward the fitting face 39, a back face of the ring gear 7 is in contact. A face 33 at the opposite side thereof is opposed to an internal surface of the cover 5 but is not necessarily in contact with the cover 5.

Figure 3:
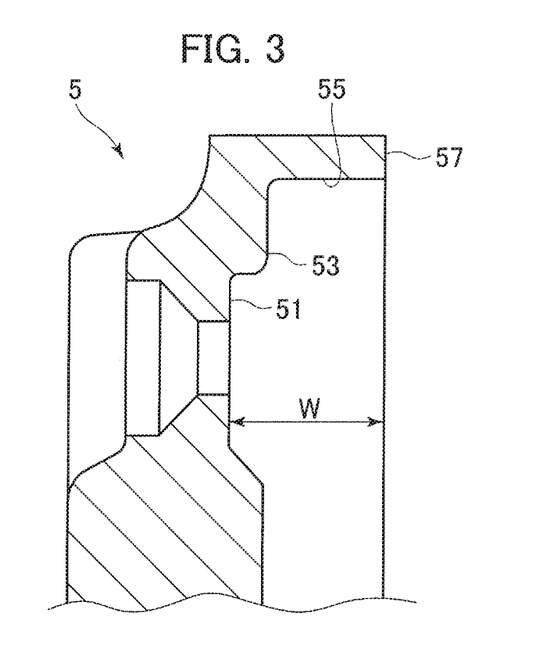
FIG. 3 is an elevational sectional view of a cover, which illustrates a brim section in an enlarged view.

Referring to FIG. 3, the cover 5 is a generally round lid made of any low-carbon steel for example. As the low-carbon steel, JIS S30C or S32C, ISO C30, AISI/SAE 1030 or such may be used but the disclosure is not limited thereto.

The cover 5 is comprised of the internal surface 51 with which the end face 31 of the carrier 3 is to be in contact. While the cover 5 may further have another internal surface 53 distinct from the internal surface 51, as will be understood from FIG. 1, this internal surface 53 may not be in contact with a surface 33 as its counterpart in the carrier 3. Specifically, contact between the end face 31 and the internal surface 51 can solely set the carrier 3 and the cover 5 axially in place.

The brim section of the cover 5 projects in the axial direction toward the carrier 3 further than the internal surfaces 51, 53, and fits on the flange of the carrier 3. An inner peripheral face 55 of the brim section is so dimensioned as to be closely in contact with the outer peripheral face 35 of the flange, so that the carrier 3 and the cover 5 are set radially in place. To fix them in the positioned state, fastening by bolts or such can be used and the cover 5 may have through-holes corresponding to the aforementioned bolt holes.

An end face 57 of the brim section, which is opposed to the ring gear 7, as will be described later in more detail, is a face provided for welding with the carrier 3 and the ring gear 7. The end face 57 is, when the cover 5 fits on the carrier 3, generally aligned with the butting face 37 of the carrier 3 to preferably form a single unitary plane. For this purpose, a width W from the internal surface 51 to the end face 57 may be made identical to a width from the end face 31 of the carrier 3 to the butting face 37.

Figure 4:
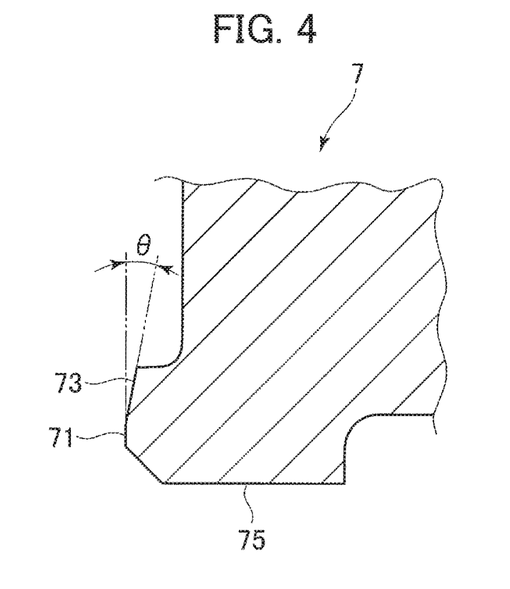
FIG. 4 is an elevational sectional view of a ring gear, which illustrates an inner peripheral face and a back face in an enlarged view.

Referring to FIG. 4, the ring gear 7 is a circular member made of any chromium-molybdenum steel for example and has gear teeth arranged in a circular row. As the chromium-molybdenum steel, JIS SCM420, ISO 18CrMo4, AISI/SAE 4130 or such may be used but the disclosure is not limited thereto. After machining, the ring gear 7 may be hardened by carburizing.

The ring gear 7, at the backside when viewed from the gear teeth, or at the inner periphery thereof, has a structure for being united with the carrier 3 and the cover 5. An inner peripheral face 75 in this structure fits on fitting face 39 of the carrier 3, and a back face 71 in this structure is at least partly in contact with the butting face 37 of the flange. And, this back face 71 projects axially slightly from the main body of the ring gear 7 so as to expose the back face 71 radially outwardly. The corner between the back face 71 and the inner peripheral face 75 may be beveled.

As is seen from the above descriptions, the carrier 3, the cover 5 and the ring gear 7 fit and come in contact with each other, as shown in FIG. 5 through FIG. 10, to set themselves in place. To fit the ring gear 7 on the carrier 3, shrinkage fitting or press-fitting may be used. While, after combining and setting these three components in place, these three components will be simultaneously welded together, a groove 15A-15F may be in advance kept among these three components in this state. As the back face 71 projects axially slightly as described above, the groove 15A-15F is exposed radially outwardly and is thus ready for welding. The groove 15A-15F may be formed in a V-letter shape in section or in any other arbitrary shape.

Figure 5:
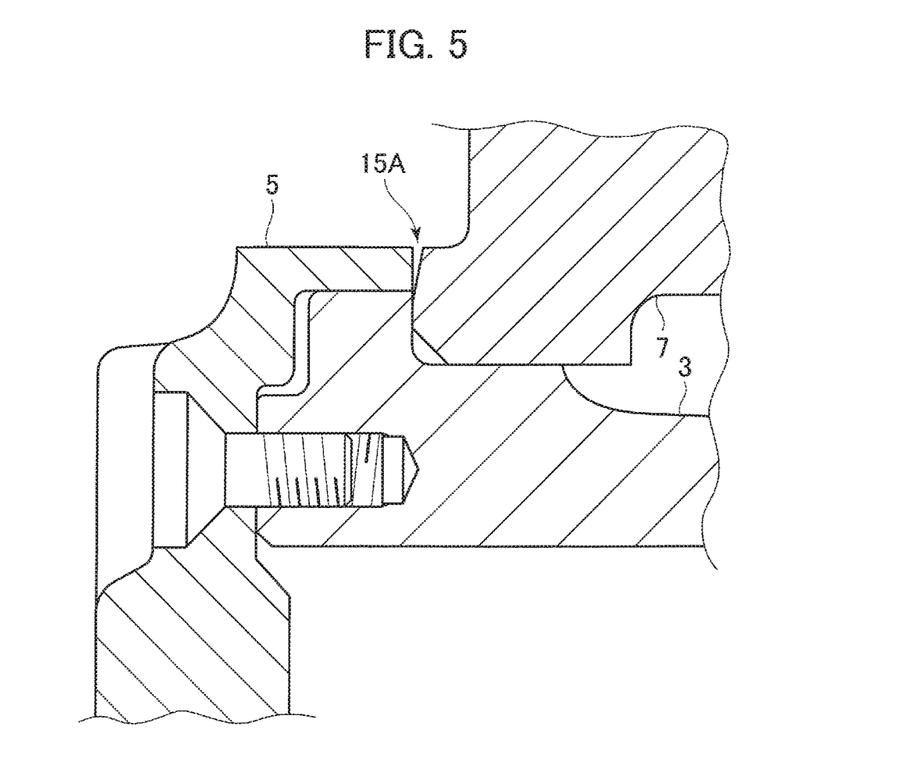
FIG. 5 is an elevational sectional view of the carrier, the cover and the ring gear united together in accordance with a first example.

To keep the groove, the back face 71 of the ring gear 7, around its edge on the outer periphery for example, may be beveled, and an angle θ of a bevel face 73 away from the back face 71 is for example larger than 0 degree and not larger than 15 degrees. When the back face 71 including the bevel face 73 contacts the butting face 37, the groove 15A is kept among the three components as shown in FIG. 5.

Figure 6:
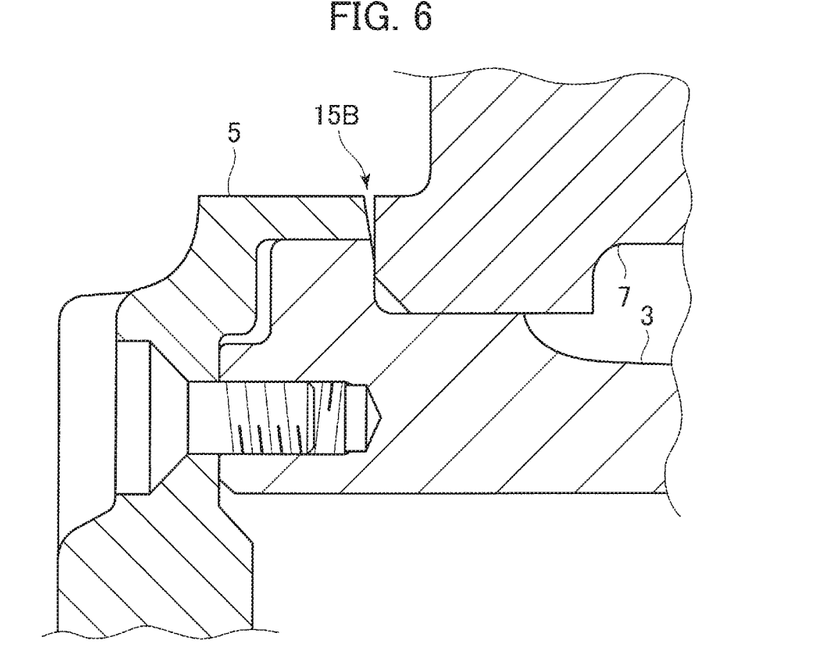
FIG. 6 is an elevational sectional view of the carrier, the cover and the ring gear united together in accordance with a second example.

Instead of beveling the back face 71, either the butting face 37 or the end face 57, or both, may be beveled. When the back face 71 is made in contact with the butting face 37, the groove 15B is kept among the three components as shown in FIG. 6.

Figure 7:
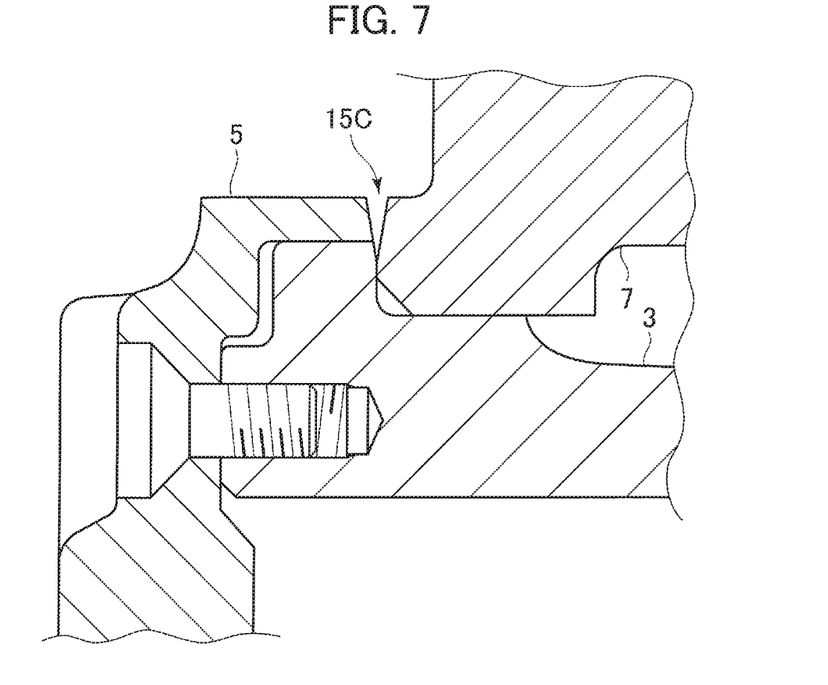
FIG. 7 is an elevational sectional view of the carrier, the cover and the ring gear united together in accordance with a third example.

Needless to say, all of the back face 71, the butting face 37 and the end face 57 may be, as shown in FIG. 7, beveled. The groove 15C is kept among the three components. This shape is more beneficial to reduction of labor for welding than those of the two examples described above are.

Figure 8:
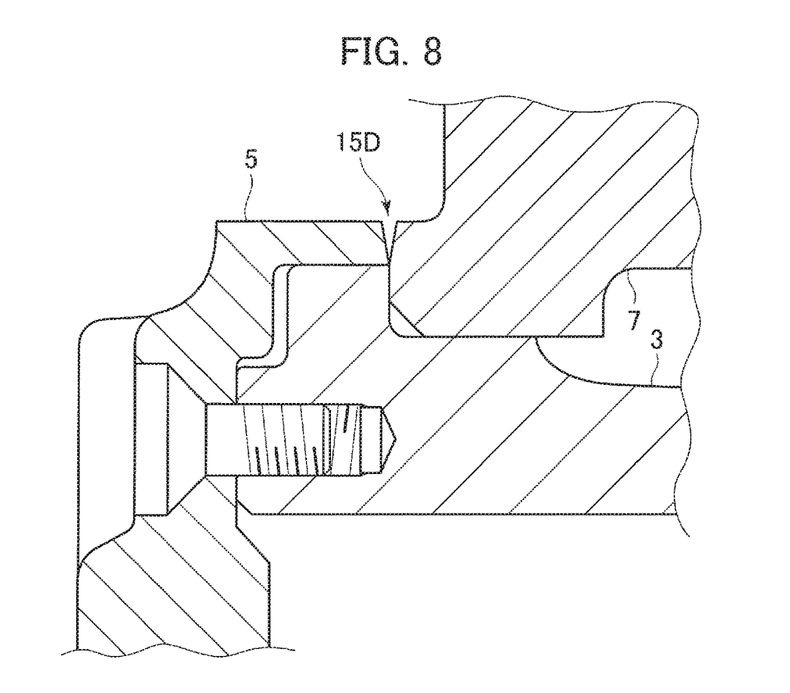
FIG. 8 is an elevational sectional view of the carrier, the cover and the ring gear united together in accordance with a fourth example.

Beveling may be given only to the back face 71 and the end face 57 in general. In this case, as shown in FIG. 8, the groove 15D is kept between the back face 71 and the end face 57 but the groove 15D can reach the interface between the back face 71 and the butting face 37. This example is more beneficial to reduction of labor for machining than the other examples are.

Figure 9:
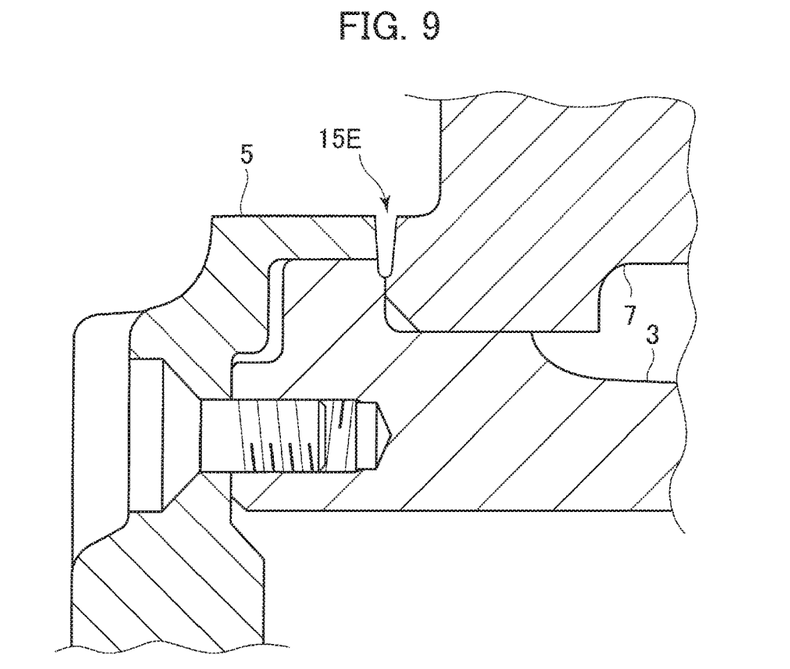
FIG. 9 is an elevational sectional view of the carrier, the cover and the ring gear united together in accordance with a fifth example.

In any of the above examples, the bottom of the groove is sharply cut in and specifically formed in a so-called V-letter shape. The bottom 15E may be, however, rounded as shown in FIG. 9 or formed in a flat, or any other, shape. These shapes are more beneficial to promoting penetration of weld metal at the bottom of the groove than those of the other examples are.

Figure 10:
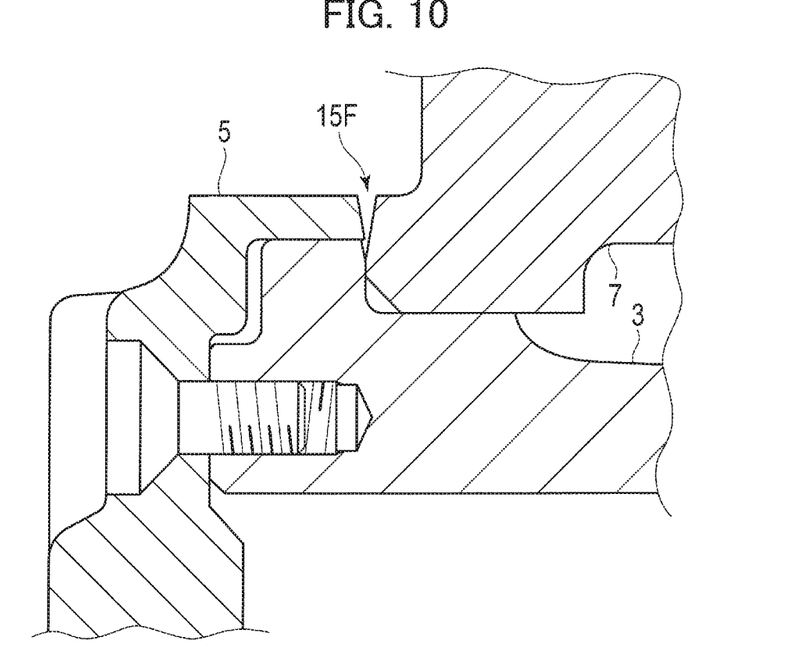
FIG. 10 is an elevational sectional view of the carrier, the cover and the ring gear united together in accordance with a sixth example.

While the end face 57 is generally aligned with the butting face 37 of the flange of the carrier 3 to form a single unitary plane yet in any of the above examples, it is unnecessary to be aligned therewith as shown in FIG. 10. As long as the back face 71 is beveled, the bottom of the groove 15F can reach the interface between the back face 71 and the butting face 37, and therefore it does not give rise to any issue in welding. This example is more beneficial to addressing the demand level for machining accuracy than the other examples are.

In any case, the groove 15A-15F reaches not only the interface between the cover 5 and the ring gear 7 but also the interface between the carrier 3 and the ring gear 7 so as to assure mutual integration among these three components by welding. The groove 15A-15F is preferably formed to make a circuit continuously around the axis.

Figure 11:
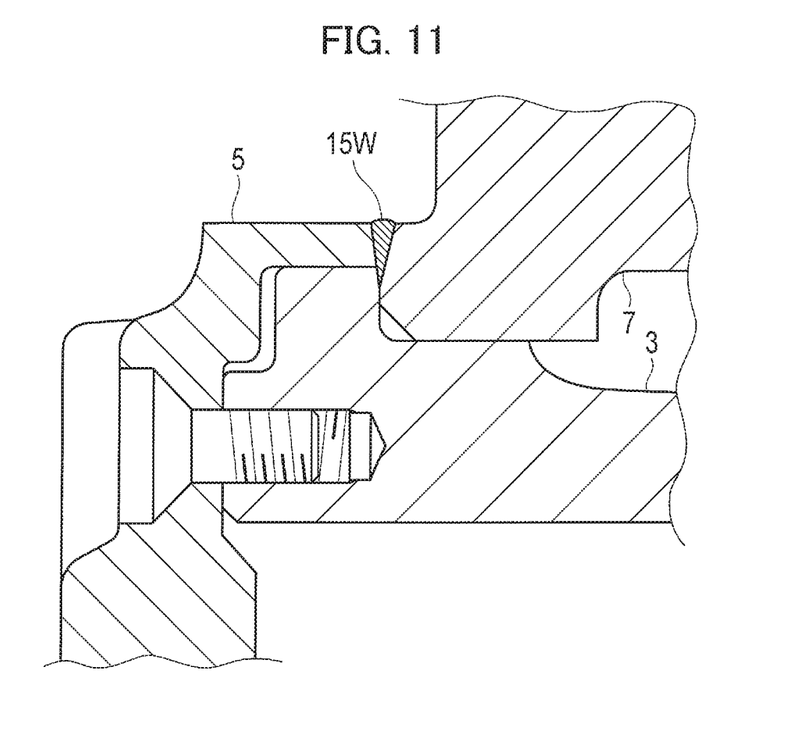
FIG. 11 is an elevational sectional view of the carrier, the cover and the ring gear after welding.

Welding may be carried out by laser-welding for example. The cover 5 and the ring gear 7 are assembled together as shown in FIG. 5 through FIG. 10, laser is focused on and radiated to the interior of the groove 15A-15F from the radial outside to the inside thereof, and simultaneously the carrier 3, the cover 5 and the ring gear 7 are uniformly rotated. Then, as shown in FIG. 11, weld metal 15W penetrates into the interior of the groove 15A-15F to unite these three components.

In place of the laser welding, any other welding method such as electron beam welding or plasma-arc welding is possible. By the electron beam welding for example, a weld zone having sufficient thickness can be effectively produced.

Welding is preferably continued to form a circuit in continuity around the axis. Bolts provided for fastening may be left in place after the welding or alternatively the bolts may be removed.

In accordance with the present embodiment, the carrier 3 and the ring gear 7 are directly united together by welding. While the torque is input through the ring gear 7 and transmitted to the carrier 3, as the ring gear 7 is directly united with the carrier 3 and thereby the weld zone bears transmission of the torque, the bolts are unnecessary to bear torque transmission and can be omitted if desired. This reduces concerns about failure of bolts by fatigue and thus provides a firm structure.

Furthermore, merely by fitting and butting the components, the carrier 3, the cover 5 and the ring gear 7 are set precisely in place. This does not additionally require any particular means for assuring accuracy.

While the carrier 3, the cover 5 and the ring gear 7 are united together by welding, independent materials can be respectively applied to them. As it is unnecessary to apply an identical material to the whole of them, cost reduction can be achieved, and as well an optimal material can be applied to each component.

Further in accordance with the present embodiment, any complex structure adapted for welding is unnecessary. Further, merely one-path welding is necessary to complete integration of the carrier 3, the cover 5 and the ring gear 7. Welding between the carrier 3 and the ring gear 7, and welding between carrier 3 and the cover 5 individually carried out are not necessary, thereby enabling low-cost integration.

In a case where individual welding is executed on each site, thermal deformation thereby would produce asymmetricity, which may give rise to any significant issue in rotary machinery such as a differential gear. In accordance with the present embodiment, however, the weld zone is continuous around the axis and therefore the deformation would be formed in a rotationally symmetrical form. This must not give rise to a significant issue.

Although certain exemplary embodiments of the invention have been described above, modifications and variations of the embodiments described above will occur to those skilled in the art, in light of the above teachings.

INDUSTRIAL APPLICABILITY

The disclosure provides a case with a simple structure, which yet enables firm fixation by welding.

The invention claimed is:

1. A case for a differential gear set, comprising:
   a carrier rotatable about an axis and supporting the differential gear set, the carrier comprising a fitting face forming a cylindrical surface around the axis and a flange projecting radially from the fitting face and having a butting face directed in an axial direction and an outer peripheral face directed radially outward;
   a cover in combination with the carrier defining a chamber for housing the differential gear set, the cover comprising a brim section so projecting axially as to fit on an outer periphery of the flange and so dimensioned as to align an end face of the brim section with the butting face and to have an inner peripheral face of the brim section being closely in contact with the outer peripheral face;
   a ring gear comprising an inner peripheral face fitting on the fitting face, a back face at least partly in contact with the butting face, and gear teeth for receiving torque about the axis; and
   a weld metal joining the carrier, the cover and the ring gear,
   wherein one or more of the butting face, the end face, and the back face are so dimensioned as to keep a circular groove exposed outward and reaching an interface between the back face and the butting face and the weld metal fills the groove.

2. The case of claim 1, wherein the butting face, the end face, and the back face are so dimensioned that the groove extends throughout the butting face, the end face, and the back face.

3. The case of claim 1, wherein the groove makes a continuous circuit around the axis.

4. The case of claim 1, wherein one or more of the back face and the butting face form a bevel face oblique to a plane of contact between the back face and the butting face.

5. The case of claim 1, wherein the end face of the carrier is so dimensioned as to align the end face of the cover with the butting face in the axial direction when the end face of the carrier contacts an internal surface of the cover.

* * * * *